(12) United States Patent
Oram

(10) Patent No.: US 9,552,191 B2
(45) Date of Patent: Jan. 24, 2017

(54) SECURE RANDOM NUMBER GENERATION

(75) Inventor: Thomas K. Oram, Hudson, MA (US)

(73) Assignee: IGT Canada Solutions ULC, Moncton (CA)

( * ) Notice: Subject to any disclaimer, the term of this patent is extended or adjusted under 35 U.S.C. 154(b) by 2263 days.

(21) Appl. No.: 12/269,621

(22) Filed: Nov. 12, 2008

(65) Prior Publication Data
US 2010/0121896 A1    May 13, 2010

(51) Int. Cl.
*G06F 7/58* (2006.01)
*H04L 9/06* (2006.01)

(52) U.S. Cl.
CPC ............. *G06F 7/582* (2013.01); *H04L 9/0662* (2013.01)

(58) Field of Classification Search
CPC ................................ G06F 7/582; H04L 9/0662
USPC .......................................................... 708/250
See application file for complete search history.

(56) References Cited

U.S. PATENT DOCUMENTS

| | | | |
|---|---|---|---|
| 5,707,268 A | 1/1998 | Outman | |
| 5,707,286 A | 1/1998 | Carlson | |
| 5,779,545 A * | 7/1998 | Berg et al. | 463/22 |
| 5,833,511 A | 11/1998 | Outman | |
| 6,076,097 A | 6/2000 | London | |
| 6,193,607 B1 | 2/2001 | Kay | |
| 6,210,274 B1 | 4/2001 | Carlson | |
| 6,264,557 B1 | 7/2001 | Schneier et al. | |
| 6,272,223 B1 | 8/2001 | Carlson | |
| 6,275,586 B1 | 8/2001 | Kelly | |
| 6,428,413 B1 | 8/2002 | Carlson | |
| 6,450,885 B2 | 9/2002 | Schneier et al. | |
| 6,503,116 B1 | 1/2003 | Suzuki et al. | |
| 6,728,740 B2 | 4/2004 | Kelly et al. | |
| 6,986,055 B2 | 1/2006 | Carlson | |
| 7,007,050 B2 | 2/2006 | Saarinen | |
| 7,260,834 B1 | 8/2007 | Carlson | |
| 7,291,069 B2 | 11/2007 | Michaelson et al. | |
| 7,329,183 B2 | 2/2008 | Michaelson et al. | |
| 2003/0069910 A1 * | 4/2003 | Kelly et al. | 708/250 |
| 2004/0167792 A1 * | 8/2004 | Diehl et al. | 705/1 |
| 2004/0209660 A1 | 10/2004 | Carlson et al. | |

(Continued)

FOREIGN PATENT DOCUMENTS

WO    WO9733669        9/1997
WO    2007037869 A1    4/2007

OTHER PUBLICATIONS

Szrek2Solutions."Szrek2Solutions, Products". https://web.archive.org/web/20070731051353/http://www.szrek.com/s2s_products.html, Jul. 31, 2007.*
Viega, John. "Practical Random Number Generation in Software". 19th Annual Computer Security Applications Conference, Dec. 31, 2003.*

(Continued)

*Primary Examiner* — Viva Miller
(74) *Attorney, Agent, or Firm* — Myers Bigel, P.A.

(57) ABSTRACT

Various aspects are directed to random, number generation. A request from a game terminal for a random number may be received. Whether a new seed is required may be determined, for example, based on the time or quantity of random numbers generated since the last re-seeding. Conditioned on determining that the new seed is required, a pseudo-random number generator may re-seeded, wherein the re-seeding comprises setting a current seed value equal to the new seed. The pseudo-random number generator may generate a random number based at least in part on the current seed value; and transmit information based on the random number to the game terminal.

34 Claims, 3 Drawing Sheets

(56) References Cited

U.S. PATENT DOCUMENTS

| | | |
|---|---|---|
| 2005/0054445 A1* | 3/2005 | Gatto et al. .................... 463/42 |
| 2005/0193209 A1 | 9/2005 | Saunders et al. |
| 2006/0020648 A1* | 1/2006 | Merati et al. ................. 708/250 |
| 2006/0121977 A1 | 6/2006 | Odom |
| 2006/0165235 A1 | 7/2006 | Carlson |
| 2007/0213125 A1* | 9/2007 | Szrek et al. .................... 463/29 |
| 2008/0032788 A1 | 2/2008 | Carlson |
| 2008/0146348 A1* | 6/2008 | Purfield et al. ................ 463/42 |
| 2008/0254878 A1 | 10/2008 | Saunders et al. |
| 2008/0254891 A1 | 10/2008 | Saunders et al. |
| 2008/0254892 A1 | 10/2008 | Saunders et al. |
| 2008/0254897 A1 | 10/2008 | Saunders et al. |
| 2008/0261679 A1 | 10/2008 | Carlson |
| 2008/0268935 A1 | 10/2008 | Acres |
| 2008/0270503 A1 | 10/2008 | Nilsson et al. |
| 2008/0287181 A1 | 11/2008 | Carlson |

OTHER PUBLICATIONS

"Trusted Play+ Overview", Jul. 24, 2006, downloaded at URL address: http://szrek2solutions.com/TPplusOverview100996.pdf.

"Trusted Monitor™", May 15, 2006, downloaded at URL address: http://szrek2solutions.com/TrustedMonitorOverview100906.pdf.

Viega J.: "Practical Random Number Generation in Software," Computer Applications Conference, Dec. 8-12, 2003, pp. 129-140, XP010673769, IEEE, Piscataway, NJ USA DOI: 10.1109/CSAC.2003.1254318 ISBN: 978-0-7695-2041-4 *Sections 4.1 and 4.2*.

Bhatia R. et al. "Validating the Itanium 2 Exception Control Unit: a Unit-Level Approach", IEEE Design & Test of Computers, vol. 21, No. 2, Mar. 2004, pp. 94-101, XP011109604, IEEE Service Center, New York, NY, USA ISSN: 0740-7475, DOI: 10.1109/MDT.20041277901 *p. 98, right-hand column, paragraph 4*.

Szrek2Solutions, "Trusted Play+™ Overview", Jul. 24, 2006.

Szrek2Solutions, "Trusted Draw™ Technical Spec", Jun. 24, 2004.

* cited by examiner

SECURE RANDOM NUMBER GENERATION

BACKGROUND

Randomly generated numbers are used to determine the outcomes of many gaming applications. For example, a randomly generated number may be used to derive a criterion or set of criteria. Entry information from each player is compared to the criterion or criteria to determine which player or players are winners. Examples of such gaming applications include, but are not limited to, slot machines, lottery systems, electronic raffle games and electronic bingo games.

Gaming applications using randomly generated numbers present several security challenges. First, the pseudo-random number generator algorithm used by many gaming applications is ultimately predictable. A pseudo-random number generator algorithm takes a seed value as input and provides a "random" number as output. If the nature and the current state (e.g. the current seed) of the algorithm is known, it is possible to predict the resulting "random" number. This means that a malicious actor with sufficient knowledge of the algorithm may predict the output of a pseudo-random number generator and improperly become a winner. Another security challenge involves making sure that a gaming application actually uses the proper randomly generated number to determine a winner or winners. For example, it is possible for a malicious actor to cause a gaming machine to discard a randomly generated number and instead use a predetermined number to determine a winner. In this manner, the malicious actor, or their associate, may improperly become a winner based on their knowledge of the predetermined number. This deception is difficult to detect, because it is difficult to distinguish a non-random number within a set of otherwise random numbers.

Existing devices address these problems with various approaches. For example, pseudo-random number generators are often run continuously, with each randomly generated number serving as a seed for the next iteration of the algorithm. When a request for a random number is received, the current output of the algorithm may be provided and used to determine the winner or winners. Because the pseudo-random number generator is running constantly, it is difficult to know the current state of the algorithm, and therefore difficult to predict its future state, particularly if the pseudo-random number generator is run at a relatively high rate of speed. Also, many gaming applications use algorithms that are burned onto chips. The chips are then certified by a third-party as containing the proper algorithm and installed into stand-alone gaming machines. Accordingly, the certified chips are unalterable without physically breaking into the gaming machines. These gaming machines may also be configured to be checked at any time to verify that the software running is the same as the software that has been certified. Another safety mechanism that may be used is an auditable random number generator. An auditable random number generator may provide random numbers that are unpredictable, yet auditable. Accordingly, it is possible, after the fact, to make sure that winners were determined based on the properly derived random number and not a maliciously inserted predetermined number. Example auditable random number generators include the FLEXdraw™ generator available from the GTECH Corporation® of Providence, R.I., and the Trusted Play™, Trusted Play+™, and Trusted Draw™ products available from Szrek2Solutions, LLC of East Greenwich, R.I.

DETAILED DESCRIPTION OF EXAMPLE EMBODIMENTS

Figure 1:
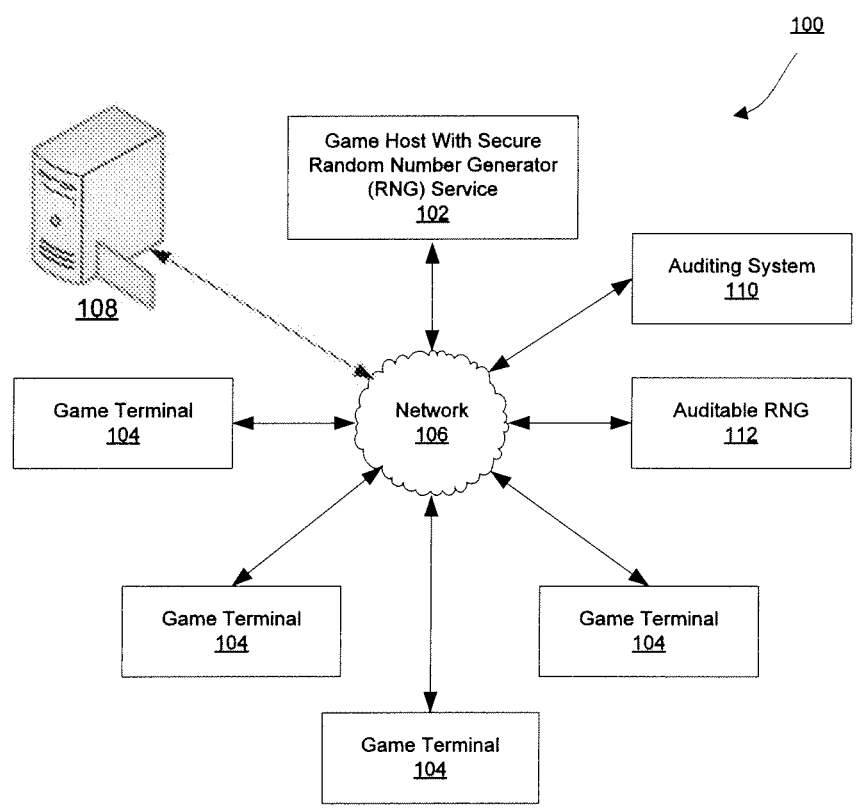
FIG. 1 illustrates one example embodiment of a server/client gaming network including a game host and a quantity of game terminals.

Various example embodiments are directed to secure, auditable random number generators for use in server/client gaming environments. In a server/client environment, random numbers for a quantity of game terminals are generated at one or more centrally positioned game hosts. The game host(s) are typically general purpose computers and/or servers, which may be accessible to maintenance and administrative personnel. As a result, it may be more difficult to prevent malicious access to the hosts. Also, because a single game host may determine random numbers for a quantity of game terminals, existing auditable random number generators, such as the FLEXdraw™ generator and the Szrek2Solutions products referenced above, may be too slow to keep up with the demand for random numbers. Accordingly, various example embodiments are directed to random number generators that are secure, auditable, and have increased speed.

One example embodiment of the present invention is a method of generating a random number. The method may include determining whether a new seed is required based at least in part on at least one factor selected from the group consisting of a quantity of random numbers that have been generated since a most recent re-seeding and a time interval that has elapsed since the most recent re-seeding. The method may also include, conditioned on determining that the new seed is required, re-seeding a pseudo-random number generator, wherein the re-seeding comprises setting a current seed value equal to the new seed. The method may also include receiving a request from a game terminal for a random number. The method may also include applying the pseudo-random number generator to generate a random number based at least in part on the current seed value; and transmitting information based on the random number to the game terminal.

Optionally, in the example method, the game terminal may be either a dedicated gaming device, such as a video slot machine, or a personal device, such as a personal computer or mobile phone. The game terminal may be configured to implement video poker, a slot machine game, electronic bingo, an electronic lottery, an electronic raffle, an electronic instant win game, a card game, a roulette game, a fantasy game or a social wagering game.

Optionally, in the example method, the quantity of random numbers that have been generated since a most recent re-seeding may be equivalent to an elapsed quantity game plays, a quantity of wagers placed, or a quantity of player entries in the game. The time interval that has elapsed since the most recent re-seeding may be equivalent to at least an elapsed time during which at least one game is in progress, or an elapsed real time.

Optionally, the random number may be generated based on the current seed value and a sequence position of the pseudo-random number generator. The information may be based on the random number may include the random number, as well as other information. Whether player is a winner based may be determined, at least in part, based on the random number, and may be determined at either the server or at the game terminal. For example, whether a player at the game terminal is a winner may be determined based at least in part on the random number; wherein the transmitted information includes an indication of whether the player at the game terminal is a winner that was derived using the random number at the server.

Optionally, the at least one factor used to decide whether to re-seed, may depend on the quantity of random numbers that have been generated since a most recent re-seeding, or the time interval that has elapsed since the most recent re-seeding. The re-seeding may be triggered responsive to a determination of whether the quantity of random numbers that have been generated since a most recent re-seeding exceeds a predetermined value. The re-seeding may include requesting a seed value from an auditable random number generator (RNG), and may also include setting a timer upon setting the current seed value equal to the new seed.

Optionally, audit information may be stored in an audit log. The audit information may include the current seed value and the quantity of random numbers that have been generated since the most recent re-seeding. The random numbers may be audited at a later time. The auditing may include determining a current seed at the time that the random number was generated; and calculating an audit random number with the pseudo-random number generator given the current seed at the time that the random number was generated. Determining the current seed at the time that the random number was generated may further include retrieving the record of the current seed at the time that the random number was generated from an audit log. The determining may also include retrieving a last new seed from an audit log; retrieving the quantity of random numbers that have been generated since the most recent re-seeding from the audit log; setting the current seed equal to the last new seed; and iterating the pseudo-random number generator through a quantity of iterations equal to the quantity of random numbers that have been generated since the most recent re-seeding.

Another example embodiment of the present invention may include a system for generating a random number. The system may include a game host, wherein the game host is implemented by at least one computer device, and wherein the game host is configured to determine whether a new seed is required based at least in part on at least one factor selected from the group consisting of a quantity of random numbers that have been generated since a most recent re-seeding and a time interval that has elapsed since the most recent re-seeding. The game host may also be configured to, conditioned on determining that the new seed is required, re-seed a pseudo-random number generator, wherein the re-seeding comprises setting a current seed value equal to the new seed. The game host may also be configured to receive a request from a game terminal for a random number. The game host may also be configured to apply the pseudo-random number generator to generate a random number based at least in part on the current seed value. The game host may also be configured to transmit information based on the random number to the game terminal.

Optionally, in the example system, the game terminal may be dedicated gaming device, such as a video slot machine or a personal device such as a personal computer or mobile phone. The game terminal may be configured to provide video poker, a slot machine game, electronic bingo, an electronic lottery, an electronic raffle, an electronic instant win game, a card game, a roulette game, a fantasy game or a social wagering game. Whether a player is a winner may be determined either at the host or at the game terminal, based at least in part on the random number that has been generated. Optionally, the transmitted information may be based on the random number and may include the random number itself as well as other information.

Optionally, the system may also include auditable random number generator (RNG), wherein re-seeding the pseudo-random number generator further comprises requesting a seed value from the auditable (RNG). The auditable random number generator may be provided implemented by a computer device separate from the at least one computer device implementing the game host or on the game host itself.

Optionally, the system may further include an audit log maintained at a storage device associated with the at least one computer device implementing the game host. The at least one computer device may be further configured to store audit information to the audit log. The audit information may include the current seed value and the quantity of random numbers that have been generated since the most recent re-seeding. The system may also include an auditing system configured to audit the random number. The auditing system may be implemented by at least one of the at least one computer device implementing the game host and a discrete computer device. The auditing system may be configured to determine a current seed at the time that the random number was generated; and calculate an audit random number with the pseudo-random number generator given the current seed at the time that the random number was generated.

FIG. 1 illustrates one example embodiment of a server/client gaming network 100. The network 100 may include a quantity of game terminals 104 and a game host 102 for implementing a secure random number generator, as described herein below. Optionally, the network 100 may also comprise a discrete auditing system 110 and/or a discrete auditable random number generator (RNG) 112. The various network components 102, 104, 110, 112 may be in secure communication with one another via a network 106. The network 106 may include any wired or wireless network type including, for example, the Internet, an intranet, a local area network (LAN), a wide area network (WAN), a virtual private network (VPN), or other network. The game terminals 104 and the host 102 may communicate according to any suitable network method or protocol. For example, in various example embodiments, two or more of the components 102, 104, 110, 112 may communicate via an e-mail server 108.

Generally, a game terminal 104 may be any terminal requiring an auditable random number. According to various embodiments, each game terminal 104 may implement a gaming application for a player. Examples of such gaming applications may include video poker, slot machine games, electronic bingo, an electronic lottery, an electronic raffle, an electronic scratch ticket or other instant game, a roulette game, etc. Other games, such as Keno, fantasy games (with and without monetary or other prizes), the GTECH Hot-Trax® game, card games, or other social wagering games may also be implemented. According to various embodiments, some game terminals 104 may be dedicated wired or wireless gaming machines, such as, for example, slot machines or video poker machines. Also, according to various embodiments, game terminals 104 may include personal devices owned by user/player clients including, for example, personal computers, personal digital assistants (PDA's), video game platforms, and mobile telephones. In this way, a user may take advantage of gaming applications administered by the game host 102 using their own devices.

According to various example embodiments, random numbers for determining winners at the game terminals 104 need not be generated at the game terminals 104, but instead may be provided at the game host 102. For example, when a game terminal 104 requires a random number, it may request the random number from the game host 102. In turn, the game host 102 may generate the random number and transmit it to the requesting game terminal 104 via the network 106, for example, in encrypted form. According to various example embodiments, the game host 102 may also apply rules for determining whether the player at the game terminal 104 is a winner and, if so, how much they have won. This information may then be provided to the requesting game terminal 104 in addition to, or instead of the raw random number.

Figure 2:
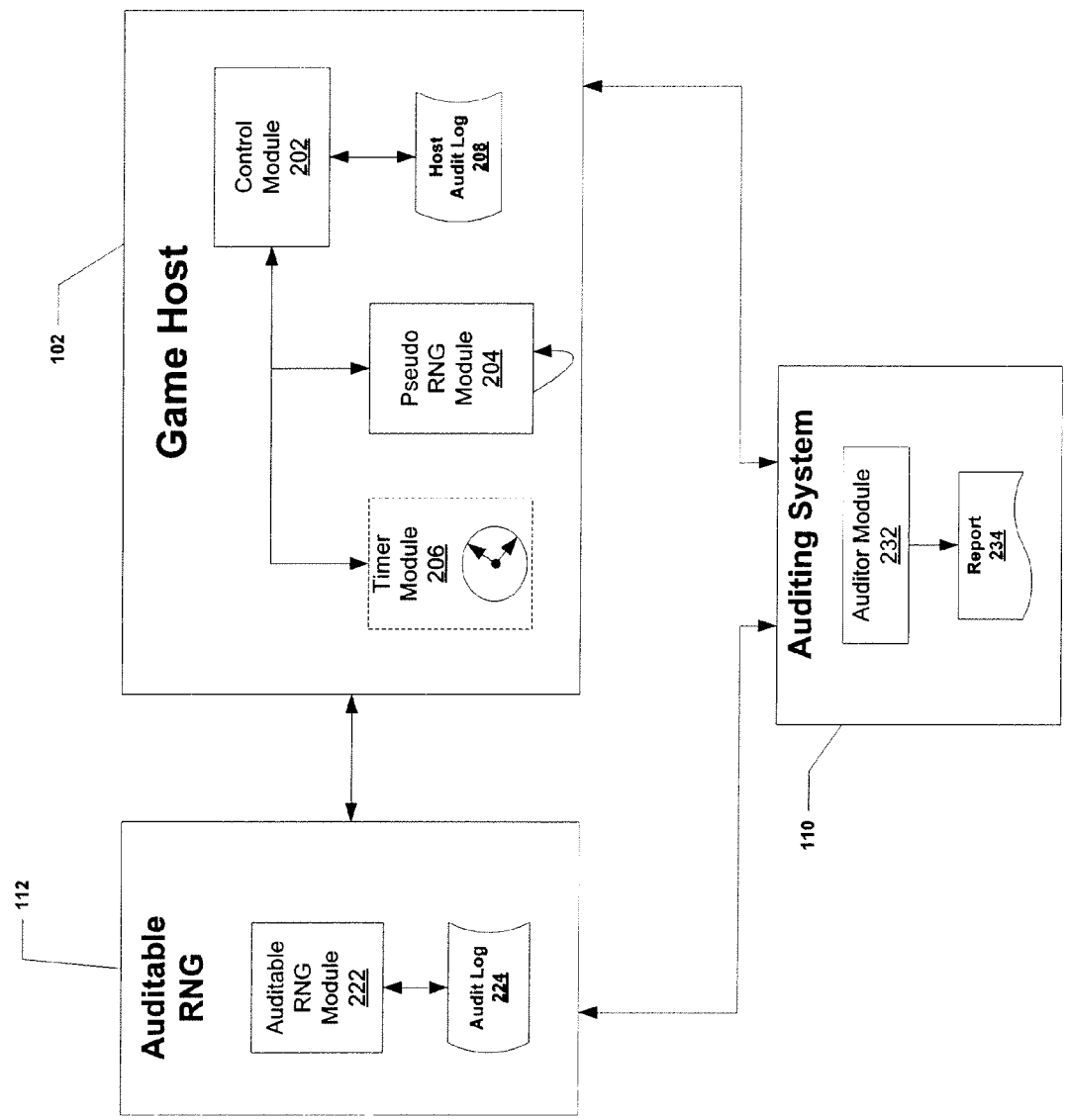
FIG. 2 illustrates a diagram of one example embodiment of the game host of FIG. 1 in communication with an auditable random number generator (RNG) and an auditing system.

FIG. 2 illustrates a diagram of one example embodiment of the game host 102 in communication with an auditable random number generator (RNG) 112 and an auditing system 110. The game host 102 may be implemented on one or more servers or other computing devices which may be at a common location or may be spatially distributed. The auditable RNG 112 and auditing system 110 may include discrete hardware components in communication with the game host 102 via the network 106, a separate secure network (not shown), and/or a direct connection. The network may also be a public, unsecured network, in which case, the random number and related information would need to be transmitted in an encrypted form by the host 102 and decrypted by the game terminal 104. According to various example embodiments, an intermediate adapter device or program may translate communications between the game host 102 and the auditable RNG 112. Also, according to various example embodiments, the auditable RNG 112 and/or the auditing system 110 may be software modules executed by the same computing device or devices as the game host 102.

In use, the game host 102 may receive and respond to random number requests from the various game terminals 104. The auditable RNG 112 may provide auditable random numbers that may be used by the game host 102 as seeds, for example, as described herein below. The auditing system 110 may verify that the numbers used to determine winners and winning amounts match the random numbers generated by the auditable RNG system 112 and the game host 102.

The game host 102 may include various modules 202, 204, 206, 208 for receiving and responding to random number requests from game terminals 104. This modules 202, 204, 206, 208 may be implemented as software, hardware and/or firmware, depending on the requirements of a particular application. A pseudo-random number generator (RNG) 204 may generate random numbers to be provided to game terminals 104 and/or used to determine winners and winnings. A timer module 206 may, in some example embodiments, be used to determine when the pseudo-RNG 204 should be re-seeded. A host audit log 208 may store information for auditing the random numbers and/or winners/winnings generated by the game host 102. The various modules 204, 206, 208 may be directed by a control module 202.

According to various example embodiments, the pseudo-RNG 204 may be seeded in a manner that both makes it difficult to know the current state of the pseudo-RNG 204 and also allows its results to be auditable. For example, the pseudo-RNG 204 may be seeded with a number received from an outside source, such as, for example, the auditable RNG 112. The control module 202 may periodically re-seed the pseudo-RNG 204. The frequency of re-seeding may be determined according to any suitable method. For example, the pseudo-RNG 204 may be reseeded at a predetermined time interval (e.g., every second, every minute, etc.). The predetermined time interval may represent a period of time during which at least one game is in progress and an elapsed real time.

The predetermined interval may be measured, for example, by the timer module 206. In some example embodiments, the pseudo-RNG may be re-seeded after a predetermined quantity of random number requests from the game terminals 104 (e.g., every 5 requests, every 100 requests, every request, etc.). It will be appreciated that the quantity of random number requests may correspond to an elapsed quantity of game plays from the terminals 104, a quantity of wagers placed from the terminals 104, and/or a quantity of player entries from the terminals 104. The game host 102 (e.g., via the control module 202) may track the quantity of random numbers provided since the most recent re-seeding of the pseudo RNG 204 and request a new seed where appropriate. In some example embodiments, the game host 102 may include capability for re-seeding the pseudo-RNG 204 based on either a time interval or a request interval (e.g., every n requests). The host 102 may be switched from a time interval mode to a request interval mode according to any suitable method. For example, a hardware implemented A/B switch (not shown) may be actuated by an administrator of the game host 102 to determine the mode. In some example embodiments, the mode (e.g., time interval or request interval) may be automatically controlled, for example, to increase the unpredictability of the resulting random numbers.

Figure 3:
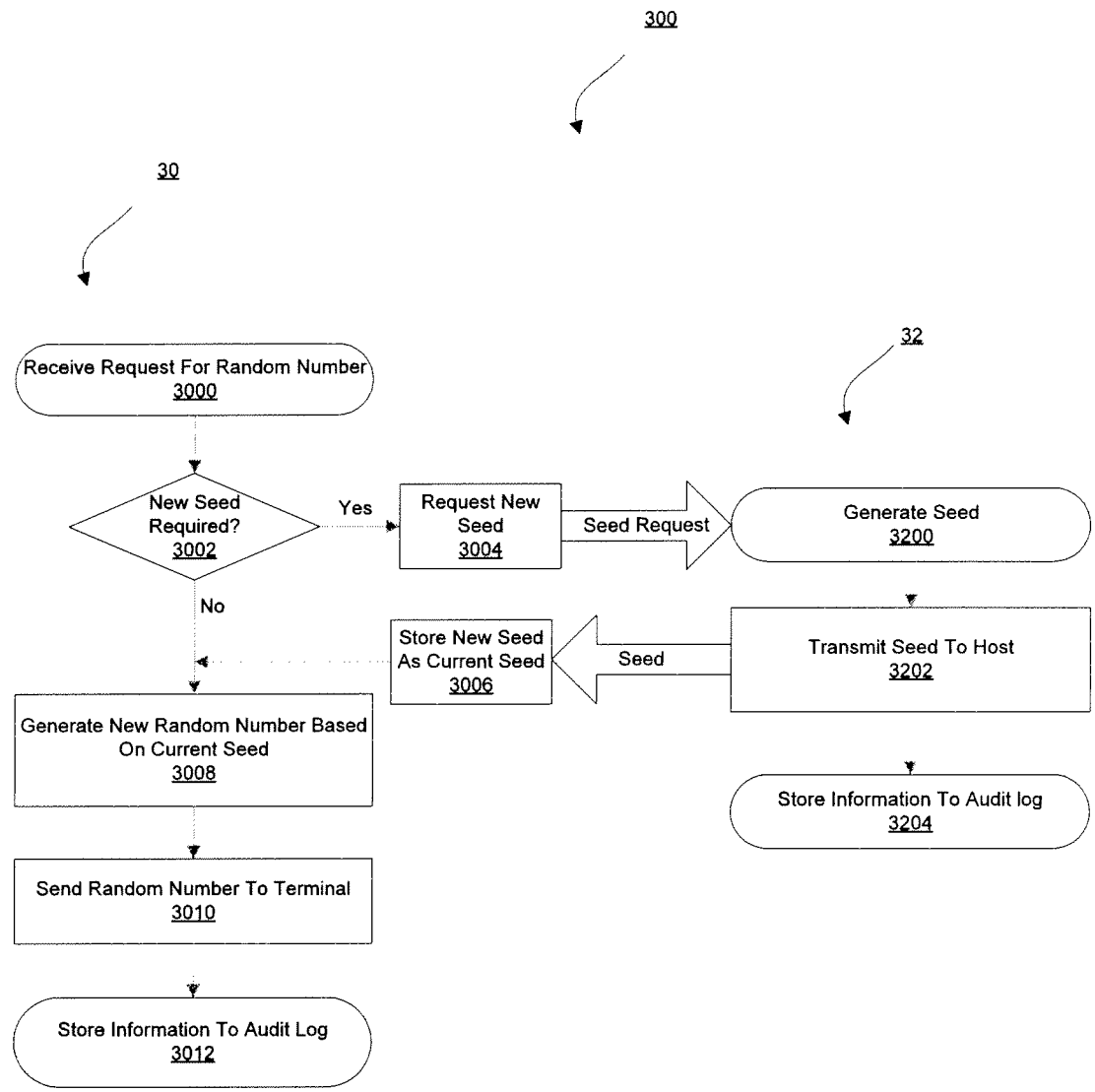
FIG. 3 illustrates one example embodiment of a process flow that may be executed by the game host of FIG. 1 to field a request for a random number from a game terminal.

FIG. 3 illustrates one example embodiment of a process flow 300 that may be executed by the game host 102 to field a request for a random number from a game terminal 104. Column 30 represents steps which are performed by the game host 102 (e.g., with the control module 202 directing the execution of the various other modules 204, 206, 208). Column 32 represents steps which are performed by the auditable RNG 112. At 3000, the game host 102 may receive from a game terminal 104 a request for a random number. At 3002, the game host 102 may determine whether the pseudo-RNG 204 should be re-seeded. For example, the game host 102 may take a reading from the timer module 206. If the reading indicates that a predetermined amount of time has passed since the last re-seeding of the pseudo-RNG 204, then re-seeding may be required. In example embodiments where the pseudo-RNG 204 is re-seeded after a predetermined quantity of transactions, the game host 102 may determine the quantity of requests that have been serviced since the last re-seeding. If that number exceeds the predetermined quantity of transactions, then re-seeding may be required.

If, at 3002, it is determined that re-seeding is required, then the game host 102 may request a new seed, for example, from the auditable RNG 112 at 3004. At 3200, the auditable RNG 112 may generate a new seed value. According to various example embodiments, the new seed value may be an auditable random number, which may be generated according to any suitable method. For example, the auditable RNG 112 may be and/or include a secure auditable random number generator such as, for example, the FLEXdraw™ system available from the GTECH Rhode Island Corporation of Providence, R.I. and the Trusted Play™, Trusted Play+™, and Trusted Draw™ products available from Szrek2Solutions, LLC of East Greenwich, R.I. At 3202, the auditable RNG 112 may transmit the new seed to the host module 112. At 3204, the RNG 112 may store audit information to its audit log 224. The audit information may include, for example, the new seed provided as well as any other information necessary to verify the authenticity of the new seed. It will be appreciated that some auditable RNG's 112 may not have an audit log 224. For example, some auditable RNG's 112 may be auditable using cryptographic methods.

The game host 102 may receive the new seed and store it as the current seed at 3006. Optionally, the game host 102 may reset the timer module 206 upon storing the new seed as the current seed. At 3008, the pseudo-RNG 204 may be used to generate a random number based on the current seed. If a new seed was requested at 3004, the current seed may be the new seed received from the auditable RNG 112. If no new seed was requested, then the current seed may be, for example, the most recent random number generated by the pseudo-RNG 204. According to various embodiments, the pseudo-RNG 204 may consider other factors in addition to the current seed including, for example, a current sequence position of the pseudo-RNG 204. The generated random number may be provided to the requesting game terminal 104 at 3010. According to various example embodiments, in addition to or instead of providing the random number, the host 102 may use the random number to determine whether the current player at the requesting game terminal 104 is a winner and, if so, the amount of their winnings. This information may then be provided to the game terminal 104 in addition to, or instead of the new random number. In some example embodiments, the host 102 may require entry information in order to determine winners and winnings. For example, in a video bingo game, the host 102 may need to know the layout of the player's bingo card. In electronic lotteries, the host 102 may need to know the numbers played by the player. In a video slot machine game, or in other games where the odds structure or other game behavior may depend on the amount wagered, the host 102 may need to know the amount of the players wager. Other games may have other similar entry information.

At 3012, the host 102 may store audit information regarding the random number to the host audit log 208. The audit information may include any information useful in verifying that the random number either provided to a game terminal 104 or used to determine winners and winnings is the correct randomly generated number. For example, the host 102 may store to the host audit log 208, the current seed, the quantity of iterations of the pseudo-RNG 205 since the last re-seeding, the time since the last re-seeding, the most recently generated random number, etc.

The auditing system 110 may be used to perform an audit of the auditable RNG 112 and the game host 102 to insure that the correct number is used to determine winners and winnings. For example, the auditing system 110 may be in communication with the auditable RNG 112. The auditing system 110 may read the audit log 224 of the auditable RNG 112 and determine, based on the audit log 224, whether the seed random numbers provided by the auditable RNG 112 are correct given the other parameters stored at the audit log 224. In embodiments where the auditable RNG 112 has no audit log 224, the auditing system 110 may audit seed random numbers provided by the auditable RNG 112 according to any suitable method including, for example, a cryptographic method. In addition to auditing seed random numbers, the auditing system 110 may read the host audit log 208 and confirm that the ultimate random number used to determine winners and winnings is correct. For example, the auditing system 110 may work backwards from the winners and winnings determined. From the winners and winnings, the auditing system 110 may determine the random number that was used to find the winners and winnings. That random number may be compared to the random number that should have been generated based on the seed, iterations since last re-seeding and/or other information stored at the host audit log 208. If the actual and expected random numbers match, it may be an indication that no error or fraud has occurred. Likewise, if the actual and expected random numbers do not match, it may be an indication that an error or fraud has occurred. The auditing system 110 may be implemented by the entity implementing the game host 102, or may be implemented by an impartial third party such as, for example, an accounting firm.

According to various embodiments, re-seeding may be implemented independently from responding to requests for random numbers. For example, when the host 102 receives a request from a terminal 104 for a random number, it may generate a random number based on the current seed and transmit the random number to the terminal 104. Independently, the host 102 may monitor the time since a most recent re-seeding. When the time since the most recent re-seeding exceeds a predetermined value, a new seed may be requested and the current seed value updated to equal the new seed.

It will be appreciated that all of the disclosed methods, games, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods, games, and procedures.

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

I claim:

1. A method of generating a random number, the method comprising:
   determining whether a new seed is required based at least in part on at least one factor selected from the group consisting of a quantity of random numbers that have been generated since a most recent re-seeding and a time interval that has elapsed since the most recent re-seeding; and
   conditioned on determining that the new seed is required, requesting an auditable random number from an auditable random number generator;

receiving a request from a game terminal for a random number;

applying a pseudo-random number generator to generate a random number based at least in part on the auditable random number from the auditable random number generator; and transmitting information based on the random number to the game terminal.

2. The method of claim 1, wherein the game terminal is selected from the group consisting of a dedicated gaming device and a personal device.

3. The method of claim 1, wherein the game terminal is configured to implement at least one game selected from the group consisting of video poker, a slot machine game, electronic bingo, an electronic lottery, an electronic raffle, an electronic instant win game, a card game, a roulette game, a fantasy game and a social wagering game.

4. The method of claim 1, wherein the quantity of random numbers that have been generated since a most recent re-seeding is equivalent to at least one value selected from the group consisting of an elapsed quantity of game plays, a quantity of wagers placed and a quantity of player entries.

5. The method of claim 1, wherein the time interval that has elapsed since the most recent re-seeding is equivalent to at least one value selected from the group consisting of an elapsed time during at least one game is in progress and an elapsed real time.

6. The method of claim 1, wherein the random number is generated based on the current seed value and a sequence position of the pseudo-random number generator.

7. The method of claim 1, wherein the information based on the random number includes the random number.

8. The method of claim 7, further comprising determining at the game terminal whether the player is a winner based at least in part on the random number.

9. The method of claim 1, further comprising:
determining whether a player at the game terminal is a winner based at least in part on the random number;
wherein the transmitted information includes an indication of whether the player at the game terminal is a winner.

10. The method of claim 1, wherein the at least one factor comprises the quantity of random numbers that have been generated since a most recent re-seeding.

11. The method of claim 1, wherein the at least one factor comprises the time interval that has elapsed since the most recent re-seeding.

12. The method of claim 1, wherein re-seeding the pseudo-random number generator further comprises requesting a seed value from an auditable random number generator (RNG).

13. The method of claim 1, further comprising:
triggering a re-seeding responsive to whether the quantity of random numbers that have been generated since a most recent re-seeding exceeds a predetermined value.

14. The method of claim 13, wherein the predetermined value is one.

15. The method of claim 1, wherein re-seeding the pseudo-random number generator further comprises:
setting a timer upon setting the current seed value equal to the new seed.

16. The method of claim 1, further comprising storing audit information to an audit log, wherein the audit information comprises the current seed value and the quantity of random numbers that have been generated since the most recent re-seeding.

17. The method of claim 1, further comprising:
auditing the random number.

18. The method of claim 17, wherein the auditing further comprises:
determining a current seed at the time that the random number was generated; and
calculating an audit random number with the pseudo-random number generator given the current seed at the time that the random number was generated.

19. The method of claim 18, wherein determining the current seed at the time that the random number was generated further comprises retrieving a record of the current seed at the time that the random number was generated from an audit log.

20. The method of claim 18, wherein determining the current seed at the time that the random number was generated comprises:
retrieving a last new seed from an audit log;
retrieving the quantity of random numbers that have been generated since the most recent re-seeding from the audit log;
setting the current seed equal to the last new seed; and
iterating the pseudo-random number generator through a quantity of iterations equal to the quantity of random numbers that have been generated since the most recent re-seeding.

21. A system for generating a random number, the system comprising:
a game host, wherein the game host is implemented by at least one computer device including a processor, and wherein the game host is configured to:
determine whether a new seed is required based at least in part on at least one factor selected from the group consisting of a quantity of random numbers that have been generated since a most recent re-seeding and a time interval that has elapsed since the most recent re-seeding; and
conditioned on determining that the new seed is required, request an auditable random number from an auditable random number generator;
receive a request from a game terminal for a random number;
apply a pseudo-random number generator to generate a random number based at least in part on the auditable random number from the auditable random number generator; and
transmit information based on the random number to the game terminal.

22. The system of claim 21, wherein the game terminal is selected from the group consisting of a dedicated gaming device and a personal device.

23. The system of claim 21, wherein the game terminal is configured to implement at least one game selected from the group consisting of video poker, a slot machine game, electronic bingo, an electronic lottery, an electronic raffle, an electronic instant win game, a card game, a roulette game, a fantasy game and a social wagering game.

24. The system of claim 21, wherein the information based on the random number includes the random number.

25. The system of claim 21, further comprising an auditable random number generator (RNG), wherein re-seeding the pseudo-random number generator further comprises requesting a seed value from the auditable (RNG).

26. The system of claim 25, wherein the auditable random number generator is implemented by at least one of a discrete computer device separate from the at least one computer device implementing the game host.

27. The system of claim 21, further comprising an audit log maintained at a storage device associated with the at least one computer device implementing the game host, wherein the at least one computer device is further configured to store audit information to the audit log, wherein the audit information comprises the current seed value and the quantity of random numbers that have been generated since the most recent re-seeding.

28. The system of claim 21, further comprising an auditing system configured to audit the random number.

29. The system of claim 28, wherein the auditing system is implemented by at least one of the at least one computer device implementing the game host and a discrete computer device.

30. The system of claim 28, wherein the auditing system is configured to:
determine a current seed at the time that the random number was generated; and
calculate an audit random number with the pseudo-random number generator given the current seed at the time that the random number was generated.

31. The system of claim 21, further wherein the game host is further configured to determine at the game terminal whether the player is a winner based at least in part on the random number.

32. A system for generating a random number, the system comprising:
an input means for receiving requests from a game terminal for a random number;
a pseudo-random number generation means for generating a pseudo-random number based on a current seed value;
a re-seeding determination means for determining whether a new seed is required for the pseudo-random number based at least in part on at least one factor selected from the group consisting of a quantity of random numbers that have been generated since a most recent re-seeding and a time interval that has elapsed since the most recent re-seeding; and
a re-seeding means for re-seeding the pseudo-random number generation means, wherein the re-seeding includes setting the current seed value equal to the new seed;
a new seed generation means for generating a new seed, wherein generating the new seed includes requesting a new seed from an auditable random number generator and
an output means for transmitting information based on the pseudo-random number to the game terminal.

33. An article of manufacture comprising a non-transitory computer readable medium having stored thereon a series of computer-executable instructions configured to, when executed by a processor, cause the performance of the method of claim 1.

34. The method of claim 1, further comprising the step of:
recording the auditable random number and the generated random number to facilitate auditing of the system.

* * * * *